US010844452B2

(12) United States Patent
Shingaki et al.

(10) Patent No.: US 10,844,452 B2
(45) Date of Patent: *Nov. 24, 2020

(54) GRAIN-ORIENTED ELECTRICAL STEEL SHEET AND METHOD FOR MANUFACTURING THE SAME

(71) Applicant: JFE STEEL CORPORATION, Tokyo (JP)

(72) Inventors: Yukihiro Shingaki, Tokyo (JP); Yasuyuki Hayakawa, Tokyo (JP); Masanori Takenaka, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 70 days.

This patent is subject to a terminal disclaimer.

(21) Appl. No.: 15/571,116

(22) PCT Filed: Jun. 9, 2016

(86) PCT No.: PCT/JP2016/002796
§ 371 (c)(1),
(2) Date: Nov. 1, 2017

(87) PCT Pub. No.: WO2016/199423
PCT Pub. Date: Dec. 15, 2016

(65) Prior Publication Data
US 2018/0171425 A1    Jun. 21, 2018

(30) Foreign Application Priority Data
Jun. 9, 2015 (JP) ................. 2015-116894

(51) Int. Cl.
| C21D 8/12 | (2006.01) |
|---|---|
| C21D 9/46 | (2006.01) |
| C22C 38/60 | (2006.01) |
| C22C 38/00 | (2006.01) |
| H01F 1/16 | (2006.01) |
| C22C 38/28 | (2006.01) |
| C22C 38/40 | (2006.01) |
| C21D 6/00 | (2006.01) |
| C22C 38/02 | (2006.01) |
| C22C 38/16 | (2006.01) |
| C22C 38/12 | (2006.01) |
| C22C 38/08 | (2006.01) |
| C22C 38/14 | (2006.01) |
| C22C 38/20 | (2006.01) |
| C22C 38/18 | (2006.01) |
| C22C 38/04 | (2006.01) |
| C22C 38/06 | (2006.01) |
| C22C 38/22 | (2006.01) |
| C22C 38/32 | (2006.01) |
| C22C 38/34 | (2006.01) |
| H01F 1/147 | (2006.01) |

(52) U.S. Cl.
CPC ........... *C21D 8/1255* (2013.01); *C21D 6/008* (2013.01); *C21D 8/12* (2013.01); *C21D 8/1272* (2013.01); *C21D 8/1283* (2013.01); *C21D 9/46* (2013.01); *C22C 38/00* (2013.01); *C22C 38/001* (2013.01); *C22C 38/002* (2013.01); *C22C 38/004* (2013.01); *C22C 38/008* (2013.01); *C22C 38/02* (2013.01); *C22C 38/04* (2013.01); *C22C 38/06* (2013.01); *C22C 38/08* (2013.01); *C22C 38/12* (2013.01); *C22C 38/14* (2013.01); *C22C 38/16* (2013.01); *C22C 38/18* (2013.01); *C22C 38/20* (2013.01); *C22C 38/22* (2013.01); *C22C 38/28* (2013.01); *C22C 38/32* (2013.01); *C22C 38/34* (2013.01); *C22C 38/40* (2013.01); *C22C 38/60* (2013.01); *H01F 1/14775* (2013.01); *H01F 1/16* (2013.01)

(58) Field of Classification Search
None
See application file for complete search history.

(56) References Cited

U.S. PATENT DOCUMENTS

| 1,965,559 A | 7/1934 | Goss |
|---|---|---|
| 3,932,234 A | 1/1976 | Imanaka et al. |
| 4,268,326 A | 5/1981 | Iwayama et al. |

(Continued)

FOREIGN PATENT DOCUMENTS

| CN | 102149830 A | 8/2011 |
|---|---|---|
| CN | 103069032 A | 4/2013 |

(Continued)

OTHER PUBLICATIONS

Yashiki et al, Effect of Annealing Atmosphere on Secondary Recrystallization in 2.3%Si-1.7 Mn Steel, 1996, Material Transactions, JIM, vol. 37, No. 3 (Year: 1996).*

Takamiya et al, Effect of hydrogen content in the final annealing atmosphere on secondary recrystallization of grain-oriented Si steel, 2003, Journal of Magnetism and Magnetic Materials 254-255 (Year: 2002).*

Sep. 13, 2016, International Search Report issued in the International Patent Application No. PCT/JP2016/002796.

(Continued)

*Primary Examiner* — Colleen P Dunn
*Assistant Examiner* — Michael J Kachmarik
(74) *Attorney, Agent, or Firm* — Kenja IP Law PC

(57) ABSTRACT

The disclosure contains, in mass % or mass ppm: C: 0.005% or less, Si: 2.0% to 5.0%, Mn: 0.01% to 0.5%, sol.Al: 10 ppm or less, N: 15 ppm or less, S and Se: each 10 ppm or less, and three or more selected from Sn, Sb, Cr, P, Mo and B whose contents satisfy a relational expression of 0.16≤[% Sn]+[% Sb]+[% Cr]+2×[% P]+[% Mo]+[% B]≤0.50, the balance being Fe and inevitable impurities, where a number of times of repeated bending in a bend test is 10 or more.

2 Claims, No Drawings

(56) References Cited

U.S. PATENT DOCUMENTS

| | | | |
|---|---|---|---|
| 4,588,453 A | 5/1986 | Shimizu et al. | |
| 4,979,997 A | 12/1990 | Kobayashi et al. | |
| 5,653,821 A | 8/1997 | Choi et al. | |
| 6,083,326 A | 7/2000 | Komatsubara et al. | |
| 8,303,730 B2 | 11/2012 | Kumano et al. | |
| 9,406,437 B2 | 8/2016 | Omura et al. | |
| 9,748,028 B2 | 8/2017 | Shingaki et al. | |
| 2003/0116236 A1 | 6/2003 | Hayakawa et al. | |
| 2003/0121566 A1 | 7/2003 | Komatsubara et al. | |
| 2005/0000596 A1 | 1/2005 | Schoen et al. | |
| 2006/0076086 A1* | 4/2006 | Terashima | C21D 1/76 148/111 |
| 2009/0032142 A1 | 2/2009 | Kumano et al. | |
| 2012/0131982 A1* | 5/2012 | Imamura | C21D 8/12 72/362 |
| 2013/0087249 A1 | 4/2013 | Takenaka et al. | |
| 2013/0143003 A1 | 6/2013 | Takenaka et al. | |
| 2014/0106130 A1 | 4/2014 | Sakai et al. | |
| 2014/0202599 A1 | 7/2014 | Watanabe et al. | |
| 2015/0318094 A1 | 11/2015 | Shingaki et al. | |
| 2016/0111190 A1 | 4/2016 | Boettcher et al. | |

FOREIGN PATENT DOCUMENTS

| | | |
|---|---|---|
| CN | 104160044 A | 11/2014 |
| EP | 1162280 A2 | 12/2001 |
| EP | 2460902 A1 | 6/2012 |
| EP | 2540844 A1 | 1/2013 |
| JP | S4015644 B | 7/1965 |
| JP | S5113469 B2 | 4/1976 |
| JP | H05320769 A | 12/1993 |
| JP | H06158167 A | 6/1994 |
| JP | H06220540 A | 8/1994 |
| JP | H0762436 A | 3/1995 |
| JP | 2782086 B2 | 7/1998 |
| JP | 2000129356 A | 5/2000 |
| JP | 2003193131 A | 7/2003 |
| JP | 2003193135 A | 7/2003 |
| JP | 2003247051 A | 9/2003 |
| JP | 2003253335 A | 9/2003 |
| JP | 2003328037 A | 11/2003 |
| JP | 2004169179 A | 6/2004 |
| JP | 2004285402 A | 10/2004 |
| JP | 2004332071 A | 11/2004 |
| JP | 2004353036 A | 12/2004 |
| JP | 2012112006 A | 6/2012 |
| JP | 2015098637 A | 5/2015 |
| JP | 6171887 B2 | 8/2017 |
| WO | 2013024772 A1 | 2/2013 |
| WO | 2014104394 A1 | 7/2014 |

OTHER PUBLICATIONS

Y.Ushigami et al., "Precipitation Behaviors of Injected Nitride Inhibitors during Secondary Recrystallization Annealing in Grain Oriented Silicon Steel", Materials Science Forum,1996, pp. 593-598, vols. 204-206, Transtec Publications Ltd.

Dec. 19, 2017, Notification of Reasons for Refusal issued by the Japan Patent Office in the corresponding Japanese Patent Application No. 2015-116894 with English language Concise Statement of Relevance.

Sep. 25, 2018, Office Action issued by the State Intellectual Property Office in the corresponding Chinese Patent Application No. 201680028665.0 with English language Search Report.

Jun. 5, 2018, Extended European Search Report issued by the European Patent Office in the corresponding European Patent Application No. 16807130.6.

Sep. 16, 2019, Office Action issued by the United States Patent and Trademark Office in the U.S. Appl. No. 15/774,370.

Aug. 6, 2019, Office Action issued by the United States Patent and Trademark Office in the U.S. Appl. No. 15/549,578.

Dec. 13, 2019, Office Action issued by the United States Patent and Trademark Office in the U.S. Appl. No. 15/549,578.

Feb. 10, 2020, Office Action issued by the United States Patent and Trademark Office in the U.S. Appl. No. 15/774,370.

Oct. 16, 2019, Communication pursuant to Article 94(3) EPC issued by the European Patent Office in the corresponding European Patent Application No. 16807130.6.

Autorenkollektiv, Spurenelemente im Stahl—Moeglichkeiten zur Beeinflussung im Smelzbetrieb, Spurenelemente in Staehlen, Verlag Stahleisen, Duesseldorf, DE, Jan. 1, 1985, pp. 19-22, XP002433212.

Apr. 20, 2020, Office Action issued by the United States Patent and Trademark Office in the U.S. Appl. No. 15/549,578.

Sreevathsan Ramanathan, Study of dislocations from continuous flattening anneal and its effect on magnetic properties of grain oriented electrical steel, A thesis submitted to the Cardiff University in candidature for the degree of Doctor of Philosophy, 2013.

Aug. 17, 2020, Office Action issued by the United States Patent and Trademark Office in the U.S. Appl. No. 15/519,909.

* cited by examiner

GRAIN-ORIENTED ELECTRICAL STEEL SHEET AND METHOD FOR MANUFACTURING THE SAME

TECHNICAL FIELD

This disclosure relates to a grain-oriented electrical steel sheet and a method for manufacturing the same.

BACKGROUND

A grain-oriented electrical steel sheet is a soft magnetic material used as an iron core material of transformers, generators, and the like. A grain-oriented electrical steel sheet has a texture where the <001> orientation, an easy magnetization axis of iron, is highly accorded with the rolling direction of the steel sheet. Such texture is formed through secondary recrystallization during manufacturing process of the grain-oriented electrical steel sheet. In the secondary recrystallization process, coarse crystal grains with (110) [001] orientation or the so-called Goss orientation grow preferentially during secondary recrystallization annealing.

Conventionally, such grain-oriented electrical steel sheets are manufactured by heating a slab containing around 4.5 mass % or less of Si and inhibitor components such as MnS, MnSe, and AlN to 1300° C. or higher to temporarily dissolve the inhibitor components; subjecting the slab to hot rolling to obtain a hot rolled sheet; performing hot band annealing to the hot rolled sheet as required, and cold rolling the hot rolled sheet once, or twice or more with intermediate annealing performed therebetween to obtain a cold rolled sheet with a final sheet thickness; subjecting the cold rolled sheet to primary recrystallization annealing in wet hydrogen atmosphere for primary recrystallization and decarburization; applying an annealing separator mainly composed of magnesia, i.e. MgO to the cold rolled sheet; and performing final annealing at 1200° C. for around 5 hours for secondary recrystallization and purification of inhibitor components (for example, U.S. Pat. No. 1,965,559 A (PTL 1), JP S40-15644 B (PTL 2), and JP S51-13469 B (PTL 3)).

As described above, when manufacturing grain-oriented electrical steel sheets with conventional processes, precipitates i.e. inhibitor components such as MnS, MnSe and AlN are contained in the slab stage, and are temporarily dissolved by slab reheating at a high temperature of 1300° C. or higher. In the following processes, the secondary recrystallization is developed by finely precipitating these inhibitor components.

Such conventional method of manufacturing grain-oriented electrical steel sheets requires slab reheating at a high temperature exceeding 1300° C. as described above. Therefore, the manufacturing cost is extremely high. For this reason, such method of manufacturing grain-oriented electrical steel sheets left a problem of failing to meet recent demands for reducing manufacturing cost.

In order to solve this problem, for example, JP 2782086 B (PTL 4) proposes a method where 0.010% to 0.060% of acid-soluble Al, i.e sol.Al is contained, slab reheating is suppressed to a low temperature, and nitridation is performed in an appropriate nitriding atmosphere during decarburization annealing process, and thereby (Al, Si)N precipitate during secondary recrystallization and are used as inhibitors.

In this case, the (Al, Si)N finely disperses in the steel and serves as effective inhibitors, and precipitates, $Si_3N_4$ or (Si, Mn)N, mainly composed of silicon nitrides only form on the surface of a steel sheet resulting from the nitriding treatment of this manufacturing method. Additionally, in the following secondary recrystallization annealing, the precipitates mainly composed of silicon nitrides change into Al-containing nitrides, (Al, Si)N or AlN, which are thermodynamically more stable. According to Y. Ushigami et. al., Materials Science Forum, Vols. 204-206, (1996), pp. 593-598 (NPL 1), the $Si_3N_4$ present near the surface dissolves as the temperature rises during the secondary recrystallization annealing, and on the other hand, nitrogen diffuses into the steel and, when the temperature exceeds 900° C., precipitates as substantially uniform Al-containing nitrides in the sheet thickness direction, which provides a full-thickness grain growth inhibiting capability, i.e. inhibition effect. It is also advantageous in that the uniformity of amount and grain size of precipitates in the thickness direction can be relatively easily achieved by this technique as compared with the precipitate dispersion control using high-temperature slab reheating.

On the other hand, study has also been made on techniques for developing secondary recrystallization without inhibitor components in the slab from the beginning. For example, JP 2000-129356 A (PTL 5) describes a technique enabling secondary recrystallization without inhibitor components. The technique is referred to as an inhibitor-less method.

The inhibitor-less method is a technique of developing secondary recrystallization by using more highly purified steel and means of texture control. With the inhibitor-less method, high-temperature slab reheating is not required, and grain-oriented electrical steel sheets can be manufactured without performing special processes such as nitriding treatment. Accordingly, the grain-oriented electrical steel sheets can be manufactured at a lower cost.

However, using such a slab containing no inhibitor components, particularly a slab containing a composition with reduced S and Se, deteriorates the bend property of the steel sheet after final annealing. The bend property herewith is evaluated according to a repeated bend test specified in JIS C 2553, which includes cutting a steel sheet with a width of 30 mm, bending the steel sheet repeatedly at a right angle by applying tension thereto, and measuring the number of times until a crack occurs in the steel sheet. The number of times until a crack occurs in the steel sheet, in other words the number of times of repeated bending, is the maximum number of times of bending with no cracks in the repeated bending test. That is to say, the last bending at which a crack occurs is not included in the number of times of bending. For example, in a case where a crack occurs at the first bending, the number of times of repeated bending is zero. When the bend property deteriorates, sheet passage through a punching line of the steel sheet causes problems such as fractures occurred at the winding part around a looper or a roller, or cracks occurred in the steel sheet during manufacturing processes of a winding transformer.

The bend property deterioration is attributable to the fact that the steel sheet tends to be oxidized when both S and Se are reduced to 50 ppm or less in the slab composition. That is to say, the grain boundaries are oxidized after the secondary recrystallization, and the oxides at the grain boundaries, after being reduced at a high temperature, combine with nitrogen in the steel to precipitate as silicon nitrides during cooling of the annealing. The silicon nitrides that precipitate at the grain boundaries become a starting point of the bend property deterioration.

In order to solve the problem, JP 2003-247051 A (PTL 6), for example, describes a method of adding Sr compound, Ca compound and Ba compound to the annealing separator. Additionally, JP 2003-328037 A (PTL 7) describes a method of adding Ti compound to the annealing separator, and controlling the highest end-point temperature of final annealing within a range of 1050° C. to 1150° C. at the same time. Furthermore, a manufacturing method of using Ar atmosphere as the atmosphere of final annealing to suppress the high-temperature reduction is also known.

CITATION LIST

Patent Literature

PTL 1: U.S. Pat. No. 1,965,559 A
PTL 2: JP S40-15644 B
PTL 3: JP S51-13469 B
PTL 4: JP 2782086 B
PTL 5: JP 2000-129356 A
PTL 6: JP 2003-247051 A
PTL 7: JP 2003-328037 A
PTL 8: JP H7-62436 A
PTL 9: WO 2014/104394

Non-Patent Literature

NPL 1: Y. Ushigami et. al., Materials Science Forum, Vols. 204-206, (1996), pp. 593-598

SUMMARY

Technical Problem

However, the method of PTL 6 uses a special annealing separation additive, which may affect the appearance, the peeling property, etc of a forsterite film formed during the secondary recrystallization annealing. Additionally, the difficulty of making the special chemicals may increase the production cost.

The method of PTL 7 lowers the highest end-point temperature of final annealing, which may adversely affect the purification of elements that are harmful to magnetic properties. Even in a case of using Ar atmosphere as the atmosphere of final annealing, it also adversely affects the purification of elements that are harmful to magnetic properties.

Therefore, how to suppress the bend property deterioration is an important problem when manufacturing grain-oriented electrical steel sheets using a slab that contains a composition with reduced S and Se. However, the methods such as those proposed in PTLs 6 and 7 could not solve the problem.

The disclosure has been contrived in view of the situation described above and an object thereof is to provide a grain-oriented electrical steel sheet which, even using a slab that contains a composition with reduced S and Se, exhibits improved bend property without deteriorating magnetic properties, and an advantageous method for manufacturing the grain-oriented electrical steel sheet.

In the disclosure, the number of times of repeated bending in a bend test means the number of times of bending until a crack occurs in the steel sheet when performing a repeated bending test according to JIS C 2553. Note that the last bending at which a crack occurs is not included in the number of times of bending, and that the repeated bending test is performed with a tension of 70 N.

The steel composition means the steel substrate composition. For example, in a case where an insulation coating and a forsterite film are formed on the surface of the steel sheet, the steel composition means the steel substrate composition after removing the coating and film.

Solution to Problem

We have intensely studied how to resolve the above problems.

Assuming that the silicon nitrides precipitated at the grain boundaries causes the deterioration of bend property when S and Se are reduced in the slab composition, we considered that changing the precipitation state of silicon nitride, which can be achieved by using elements that segregate at the grain boundaries (hereinafter, "grain boundary segregation type element"), may suppress the deterioration of bend property. Specifically, we considered that changing the precipitation state of silicon nitride from precipitating at grain boundaries to precipitating in grains, which can be achieved by leaving an appropriate amount of grain boundary segregation elements during cooling of the final annealing, may suppress the deterioration of bend property caused by grain boundary cracking.

However, the use of special elements generally causes problems such as formation of precipitates or formation of inclusions like oxides, and accordingly may lead to deterioration of magnetic properties.

For this reason, we added various elements and investigated the effects of improving bend property. As a result, we focused on six elements of Sn, Sb, Cr, P, Mo and B.

These elements are all grain boundary segregation type elements. Using these elements from the slab stage improves the properties of a grain-oriented electrical steel sheet. However, a large amount of these elements remaining after purification annealing deteriorates the magnetic properties. Therefore, most of these elements are usually removed by purification annealing.

However, since none of these elements can be 100% purified, they may remain in the steel in various forms. For this reason, each of these elements is considered to have a content which does not significantly deteriorate magnetic properties even being retained in the steel.

On the other hand, for a grain-oriented electrical steel sheet manufactured using a slab containing a composition with reduced S and Se, silicon nitrides precipitate at the grain boundaries after secondary recrystallization annealing, that is to say during a cooling process after purification annealing, and the precipitation leads to the deterioration of bend property. Therefore, in order to improve the bend property, it is important to allow the above-mentioned grain boundary segregation type elements to remain after secondary recrystallization annealing i.e. purification annealing at a predetermined amount rather than to add a certain amount of grain boundary segregation type elements in the slab stage.

Based on the above studies, we have conducted the following experiment and developed this disclosure. Hereinbelow, reference will be made to the experiment.

Experiment 1

A vacuum steel ingot containing, in mass % or mass ppm, C: 0.05%, Si: 3.2%, Mn: 0.09%, sol.Al: 50 ppm, N: 30 ppm, S: 20 ppm, O: 14 ppm as basic components with the balance being Fe and inevitable impurities was prepared. Three or four or more of the six elements Sn, Sb, Cr, P, Mo, B were added to the vacuum steel ingot in various amounts to obtain a steel ingot by steelmaking. The steel ingot was heated to 1150° C., and then subjected to hot rolling to obtain a hot rolled sheet with a thickness of 3.0 mm. The hot rolled sheet was annealed at 1000° C. for 60 seconds and then rolled to 0.35 mm to obtain a cold rolled sheet. Subsequently, the cold rolled sheet was heated to 820° C. in wet hydrogen atmosphere, with an average heating rate of 90° C./s within a temperature range of 500° C. to 700° C., and then subjected to primary recrystallization annealing, i.e. decarburization annealing in which soaking was performed for 120 seconds at 820° C. Subsequently, slurry was prepared by adding MgO as a main agent, and MgSO$_4$ and the like as additives. The slurry, as an annealing separator, was applied to the steel sheet resulting from the primary recrystallization annealing, and was dried. Subsequently, the steel sheet was kept at a temperature range of 800° C. to 900° C. for 30 hours, heated to 1200° C., which is the highest end-point temperature of H$_2$ atmosphere in a range of 1000° C. or higher, and subjected to secondary recrystallization annealing where purification was performed by soaking the steel sheet for 10 hours at this temperature and in this atmosphere. A coating liquid containing phosphate-chromate-colloidal silica was applied to the steel sheet resulting from the secondary recrystallization annealing and baked at around 800° C. to form an insulating coating. Subsequently, the resulting steel sheet was cut out to a size specified in JIS C 2550 and bent repeatedly at a right angle under a tension of 70 N. The number of times until a crack occurs in the steel sheet was measured to evaluate the bend property. The measurement was carried out with the maximum number of times of bending being 10. The results are listed in Table 1. In a case where the number of times of bending reaches ten with no crack occurring, the number of times of repeated bending is indicated as "10 or more".

Furthermore, the contents of the grain boundary segregation type elements of Sn, Sb, Cr, P, Mo and B remaining in the steel after secondary recrystallization annealing was measured. The insulating coating and forsterite film on the surface of the steel sheet was removed before the measurement. The results are listed in Table 1.

Note that both Al and N in the steel were purified to 5 ppm or less, and S was purified to 4 ppm or less.

Additionally, the content of silicon nitride that precipitates at crystal grain boundaries of the steel sheet was also measured with the following method. Polish the surface of the steel sheet, etch the surface of the steel sheet with nital, observe ten locations at 100 times magnification under an optical microscope or at 1000 times magnification under a scanning electron microscope, measure the total grain boundary length of crystal grain boundaries (hereinafter, "total grain boundary length"), and the total length of the grain boundaries at which silicon nitrides precipitate (hereinafter, "total grain boundary silicon nitride length") of each location, and calculate (total grain boundary silicon nitride length)/(total grain boundary length)×100, in other words, a ratio of the total grain boundary length of the crystal grain boundaries at which silicon nitrides precipitate to the total grain boundary length of crystal grain boundaries. The results are also listed in Table 1.

TABLE 1

| | Steel composition of the steel sheet after secondary recrystallization annealing (mass %) | | | | | | [Sn] + [Sb] + [Cr] + 2 × [P] + [Mo] + [B] | Repeated | Ratio of total length of grain boundaries at which silicon nitrides precipitate to total grain boundary length |
|---|---|---|---|---|---|---|---|---|---|
| No. | Sn | Sb | Cr | P | Mo | B | (mass %) | bending times | (%) |
| 1 | 0.015 | 0.048 | 0.062 | 0.033 | — | 0.001 | 0.192 | 10 or more | 0.0 |
| 2 | — | 0.038 | 0.032 | 0.049 | 0.021 | — | 0.189 | 10 or more | 0.1 |
| 3 | 0.035 | 0.035 | 0.053 | 0.022 | 0.011 | — | 0.178 | 10 or more | 0.3 |
| 4 | 0.005 | 0.019 | 0.058 | 0.036 | 0.010 | 0.001 | 0.165 | 10 or more | 0.5 |
| 5 | — | 0.041 | 0.041 | 0.035 | 0.008 | 0.001 | 0.161 | 10 or more | 0.5 |
| 6 | — | 0.051 | 0.031 | 0.033 | — | 0.003 | 0.151 | 8 | 1.0 |
| 7 | 0.025 | — | 0.080 | 0.011 | 0.005 | — | 0.132 | 9 | 1.5 |
| 8 | — | 0.035 | 0.047 | 0.018 | 0.008 | 0.001 | 0.127 | 6 | 2.0 |
| 9 | — | 0.011 | 0.030 | 0.024 | 0.032 | — | 0.121 | 3 | 2.5 |
| 10 | 0.041 | 0.015 | 0.042 | 0.008 | — | — | 0.114 | 3 | 2.5 |
| 11 | 0.028 | 0.033 | 0.025 | 0.008 | 0.005 | 0.001 | 0.108 | 5 | 3.0 |
| 12 | 0.032 | 0.022 | 0.012 | 0.012 | — | 0.001 | 0.091 | 1 | 3.5 |
| 13 | — | — | 0.015 | 0.025 | 0.015 | 0.003 | 0.083 | 1 | 4.0 |
| 14 | — | 0.025 | 0.022 | 0.013 | — | — | 0.073 | 0 | 5.0 |
| 15 | 0.010 | — | 0.013 | 0.015 | — | 0.001 | 0.054 | 0 | 5.5 |

According to Table 1, it is understood that containing three or more selected from Sn, Sb, Cr, P, Mo and B, and controlling the contents of these elements within the range of a following relational expression (1) effectively improves the bend property.

$$0.16 \leq [\% \text{ Sn}] + [\% \text{ Sb}] + [\% \text{ Cr}] + 2 \times [\% \text{ P}] + [\% \text{ Mo}] + [\% \text{ B}] \leq 0.50 \quad (1)$$

where [% Sn], [% Sb], [% Cr], [% P], [% Mo] and [% B] each indicate the contents of Sn, Sb, Cr, P, Mo and B contained in the steel.

Furthermore, in the above relational expression (1), the 2×[% P] means that P is twice as effective as other elements. We consider that the reason may be that P and Si are adjacent elements in the periodic table, and accordingly the segregation of P strongly influences the diffusion of Si to the grain boundaries, which more effectively suppresses the precipitation of silicon nitride.

As described above, the use of the predetermined grain boundary segregation type elements of Sn, Sb, Cr, P, Mo and B suppresses the segregation of silicon nitride to the grain boundaries, so that high-temperature purification in H$_2$ atmosphere during secondary recrystallization annealing becomes possible. As a result, it is possible to reduce Al, N, S and Se, which affect magnetic properties even in small amounts, to trace amounts.

Regarding the precipitation state of silicon nitride at grain boundaries, it is preferable to keep the ratio of the total grain boundary length of the crystal grain boundaries at which silicon nitrides precipitate to the total grain boundary length of crystal grain boundaries 1.0% or less. With such a content of silicon nitride precipitated at the crystal grain boundaries, it is possible to improve the bend property more stably.

The disclosure is based on the aforementioned discoveries and further studies.

Specifically, the primary features of this disclosure are as described below.

1. A grain-oriented electrical steel sheet comprising a steel composition containing (consisting of), in mass % or mass ppm: C: 0.005% or less, Si: 2.0% to 5.0%, Mn: 0.01% to 0.5%, sol.Al: 10 ppm or less, N: 15 ppm or less, S and Se: each 10 ppm or less, and at least three selected from Sn, Sb, Cr, P, Mo and B whose contents satisfy the following relational expression (1), $$0.16 \le [\% \text{ Sn}]+[\% \text{ Sb}]+[\% \text{ Cr}]+2\times[\% \text{ P}]+[\% \text{ Mo}]+[\% \text{ B}] \le 0.50 \quad (1)$$

where [% Sn], [% Sb], [% Cr], [% P], [% Mo] and [% B] each indicate contents in mass % of Sn, Sb, Cr, P, Mo and B in the steel,
with the balance being Fe and inevitable impurities, where a number of times of repeated bending in a bend test is 10 or more.

2. The grain-oriented electrical steel sheet according to 1., where a ratio of total grain boundary length of crystal grain boundaries at which silicon nitrides precipitate to total grain boundary length of crystal grain boundaries is 1.0% or less.

3. The grain-oriented electrical steel sheet according to 1. or 2., where the steel composition further contains at least one selected from, in mass %: Ni: 0.005% to 1.50%, Cu: 0.01% to 0.50%, Nb: 0.0005% to 0.0100%, Ti: 0.0005% to 0.0100%, and Bi: 0.0005% to 0.0100%.

4. A method for manufacturing a grain-oriented electrical steel sheet including:
preparing a steel slab containing, in mass % or mass ppm: C: 0.10% or less, Si: 2.0% to 5.0%, Mn: 0.01% to 0.5%, S, Se and O: each less than 50 ppm, sol.Al: less than 100 ppm, N: 80 ppm or less, and at least three selected from Sn: 0.01% to 0.50%, Sb: 0.005% to 0.50%, Cr: 0.01% to 1.50%, P: 0.0050% to 0.50%, Mo: 0.01% to 0.50%, and B: 0.0001% to 0.0100% whose contents satisfy the following relational expression (2), $$0.16 \le [\% \text{ Sn}]+[\% \text{ Sb}]+[\% \text{ Cr}]+2\times[\% \text{ P}]+[\% \text{ Mo}]+[\% \text{ B}] \quad (2)$$

where [% Sn], [% Sb], [% Cr], [% P], [% Mo] and [% B] each indicate contents in mass % of Sn, Sb, Cr, P, Mo and B in the steel,
with the balance being Fe and inevitable impurities;
subjecting the steel slab to hot rolling without heating or after heating to obtain a hot rolled sheet;
then subjecting the hot rolled sheet to cold rolling once, or twice or more with intermediate annealing performed therebetween to obtain a cold rolled sheet;
then subjecting the cold rolled sheet to primary recrystallization annealing and applying an annealing separator to the cold rolled sheet; and
then subjecting the cold rolled sheet to secondary recrystallization annealing for both purification and annealing, wherein
the annealing separator is an annealing separator mainly composed of MgO, and
the secondary recrystallization annealing has an average heating rate of 5° C./hour or lower at least at a temperature range of 800° C. to 900° C., and a gas composition of atmosphere containing $H_2$: 10 vol % or more at a temperature range of 1000° C. or higher and lower than 1100° C.

5. The method for manufacturing a grain-oriented electrical steel sheet according to 4., where the steel slab further contains at least one selected from, in mass %: Ni: 0.005% to 1.50%, Cu: 0.01% to 0.50%, Nb: 0.0005% to 0.0100%, Ti: 0.0005% to 0.0100%, and Bi: 0.0005% to 0.0100%.

6. The method for manufacturing a grain-oriented electrical steel sheet according to 4. or 5., where the primary recrystallization annealing has an average heating rate of 50° C./s or higher at least at a temperature range of 500° C. to 700° C.

7. The method for manufacturing a grain-oriented electrical steel sheet according to any one of 4. to 6., where
nitriding treatment is performed during the primary recrystallization annealing, or after the primary recrystallization annealing and before applying the annealing separator, and
the steel slab contains, in mass %, Cr: 0.01% to 0.10%, Mo: 0.01% to 0.05%, and B: 0.0001% to 0.001% when Cr, Mo and/or B are contained in the steel slab.

Advantageous Effect

According to the disclosure, a grain-oriented electrical steel sheet which, even when the slab contains a composition with reduced S and Se, exhibits improved bend property without deteriorating magnetic properties can be obtained, so that the industrial value is very high.

DETAILED DESCRIPTION

The following describes the disclosure in detail.

First, reference will be made to the steel composition of the grain-oriented electrical steel sheet of the disclosure. Although the unit of content of each element contained in the steel composition is "mass %" or "mass ppm", they will be simply expressed as "%" or "ppm" unless otherwise specified.

The steel composition of the grain-oriented electrical steel sheet of the disclosure contains: C: 0.005% or less, Si: 2.0% to 5.0%, Mn: 0.01% to 0.5%, sol.Al: 10 ppm or less, N: 15 ppm or less, one or two selected from S and Se in an amount of 10 ppm or less, and three or more selected from Sn, Sb, Cr, P, Mo and B whose contents satisfy the following relational expression (1), the balance being Fe and inevitable impurities, $$0.16 \le [\% \text{ Sn}]+[\% \text{ Sb}]+[\% \text{ Cr}]+2\times[\% \text{ P}]+[\% \text{ Mo}]+[\% \text{ B}] \le 0.50 \quad (1)$$

where [% Sn], [% Sb], [% Cr], [% P], [% Mo] and [% B] each indicate the contents of Sn, Sb, Cr, P, Mo and B (mass %) contained in the steel.

For the grain-oriented electrical steel sheet of the disclosure, it is particularly important to contain three or more selected from Sn, Sb, Cr, P, Mo and B, and to make the contents of these elements satisfy the above relational expression (1).

This is because that, although the contents of these elements exceeding certain amounts, particularly Sn, Sb, Cr, P and Mo being 0.1% or more and B being more than 0.001%, may cause deterioration of iron loss of the steel sheet after final annealing because of formation of precipitates or the like, combined addition of three or more of these elements in a trace amount each suppresses the grain boundary precipitation of silicon nitride and improves the bend property without deteriorating iron loss.

Therefore, the grain-oriented electrical steel sheet of the disclosure contains three or more selected from Sn, Sb, Cr, P, Mo and B, and the contents of these elements satisfy that ([% Sn]+[% Sb]+[% Cr]+2×[% P]+[% Mo]+[% B]) is 0.16 mass % or more.

However, a too large ([% Sn]+[% Sb]+[% Cr]+2×[% P]+[% Mo]+[% B]) deteriorates iron loss. Accordingly, there is an upper limit of 0.50 mass % or less.

As described above, the grain-oriented electrical steel sheet of the disclosure contains three or more selected from Sn, Sb, Cr, P, Mo and B, which means these elements are retained after secondary recrystallization annealing, i.e. purification annealing, and the contents of these elements satisfy the above relational expression (1). In this way, the grain boundary precipitation of silicon nitride is suppressed, and thereby the number of times of repeated bending in the bend test can reach 10 or more.

Furthermore, for the grain-oriented electrical steel sheet of the disclosure, in addition to appropriately controlling the contents of the above-mentioned Sn, Sb, Cr, P, Mo and B, it is also important to suppress sol.Al to 10 ppm or less, N to 15 ppm or less, and one or two selected from S and Se to an amount of 10 ppm or less. The reason is that elements such as Al, N, S and Se affect magnetic properties even in small amounts, so it is desirable to reduce their contents as much as possible. It is preferable that Sol.Al is 5 ppm or less, N is 5 ppm or less, and S and Se are each 5 ppm or less. The lower limits of sol.Al, N, S and Se are not particularly limited, and may be 0 ppm.

The content of O, i.e. oxygen is preferably 10 ppm or less. The lower limit of O is not particularly limited, and may be 0 ppm.

In the above, the components that are particularly important for the grain-oriented electrical steel sheet of the disclosure have been described. Since the description of other components overlaps with the following description of the chemical composition of steel slab, it is omitted here.

Regarding the precipitation state of silicon nitride at crystal grain boundary, it is preferable to set the ratio of the total grain boundary length of the crystal grain boundaries at which silicon nitrides precipitate to the total grain boundary length of crystal grain boundaries to 1.0% or less. Such a content of silicon nitride precipitated at the crystal grain boundaries can improve the bend property more stably. The ratio is more preferably 0.2% or less. The lower limit is not particularly limited, and may be 0%.

The content of silicon nitride precipitated at the crystal grain boundaries can be measured with the following method. Polish the surface of the steel sheet, etch the surface of the steel sheet with nital, observe ten locations at 100 times magnification under an optical microscope or at 1000 times magnification under a scanning electron microscope, measure the total grain boundary length and the total grain boundary silicon nitride length of each location, and calculate (total grain boundary silicon nitride length)/(total grain boundary length)×100, in other words, a ratio of the total grain boundary length of the crystal grain boundaries at which silicon nitrides precipitate to the total grain boundary length of crystal grain boundaries as the content of silicon nitride precipitated at the crystal grain boundaries.

Subsequently, a method for manufacturing the grain-oriented electrical steel sheet of the disclosure will be described. First, reference will be made to the chemical composition of the steel slab.

C: 0.10% or Less

C is an element useful for improving primary recrystallized texture. However, a C content exceeding 0.10% deteriorates primary recrystallized texture on the contrary. Therefore, the C content is set to 0.10% or less. Furthermore, the C content is desirably in a range of 0.01% to 0.07% from the perspective of magnetic properties. In a case where the required level of magnetic properties is not very high, the C content may be 0.01% or less for the purpose of omitting or simplifying the decarburization during primary recrystallization annealing. The lower limit is not particularly limited, and may be 0%.

Moreover, for the steel composition of the steel sheet after final annealing, it is essential to reduce the C content to 0.005% or less by purification in order to prevent magnetic aging. The lower limit is not particularly limited, and may be 0%.

Si: 2.0% to 5.0%

Si is an element useful for improving iron loss by increasing electrical resistance. However, a Si content exceeding 5.0% significantly deteriorates cold rolling manufacturability. Therefore, the Si content is set to 5.0% or less. Furthermore, since Si serves as a nitride-forming element, a Si content of 2.0% or more is required. Moreover, the Si content is preferably in a range of 2.5% to 4.5% from the perspective of iron loss.

Mn: 0.01% to 0.5%

Mn has an effect of improving hot workability during manufacturing. However, this effect cannot be obtained with a Mn content of less than 0.01%. On the other hand, a Mn content exceeding 0.5% deteriorates primary recrystallized texture, which accordingly deteriorates magnetic properties. Therefore, the Mn content is set to 0.01% to 0.5%.

S, Se and O: Each Less than 50 ppm

When the contents of S, Se and O are each 50 ppm or more, the uniformity of primary recrystallized microstructure, which is important for the inhibitor-less method, is impaired. This is because that coarse oxides, or MnS and MnSe coarsened by slab reheating partly suppress the grain growth during primary recrystallization annealing. Therefore, S, Se and O are all suppressed to less than 50 ppm. The lower limits of S, Se and O are not particularly limited, and may be 0 ppm.

Sol.Al: Less than 100 ppm

Al may form a dense oxide film on the surface, which inhibits the decarburization. Therefore, Al is suppressed to less than 100 ppm in an amount of sol.Al. However, adding a trace amount of Al, which has high affinity with oxygen, during steelmaking is expected to bring about such effects as to reduce the amount of dissolved oxygen in steel and to reduce oxide inclusions which would lead to deterioration of properties. Therefore, adding an amount of 100 ppm or less curbs deterioration of magnetic properties. The lower limit of sol.Al is not particularly limited, and may be 0 ppm.

N: 80 ppm or Less

N prevents the action of inhibitors and makes it difficult to develop secondary recrystallization. Additionally, an excessive content of N may lead to formation of silicon nitride, which is a starting point of cracking during cold rolling. Therefore, the N content is set to 80 ppm or less. The lower limit of N is not particularly limited, and may be 0 ppm.

The steel slab used in the method for manufacturing the grain-oriented electrical steel sheet of the disclosure is required to contain three or more selected from Sn, Sb, Cr, P, Mo and B within the following ranges, so that the steel composition of the steel sheet after final annealing satisfies the range of the above relational expression (1).

Sn: 0.01% to 0.50%

Sn is a useful element which improves magnetic properties by suppressing nitridation and oxidization of steel sheet during secondary recrystallization annealing and facilitating secondary recrystallization of crystal grains having good crystal orientation. To obtain this effect, the Sn content is preferably 0.01% or more. However, a Sn content exceeding 0.50% deteriorates cold rolling manufacturability. Therefore, the Sn content is set in a range of 0.01% to 0.50%. The Sn content is preferably in a range of 0.05% to 0.15%.

Sb: 0.005% to 0.50%

Sb is a useful element which effectively improves magnetic properties by suppressing nitridation and oxidization of steel sheet during secondary recrystallization annealing and facilitating secondary recrystallization of crystal grains having good crystal orientation. To obtain this effect, the Sb content is preferably 0.005% or more. However, a Sb content exceeding 0.50% deteriorates cold rolling manufacturability. Therefore, the Sb content is set in a range of 0.005% to 0.50%. The Sb content is preferably in a range of 0.02% to 0.15%.

Cr: 0.01% to 1.50%

Cr provides an effect of stabilizing formation of forsterite film. To obtain this effect, the Cr content is preferably 0.01% or more. However, when the Cr content exceeds 1.50%, it becomes difficult to develop secondary recrystallization, and magnetic properties deteriorate. Therefore, the Cr content is set in a range of 0.01% to 1.50%. The Cr content is preferably in a range of 0.03% to 0.15%.

P: 0.0050% to 0.50%

P provides an effect of stabilizing formation of forsterite film. To obtain this effect, the P content is preferably 0.0050% or more. However, a P content exceeding 0.50% deteriorates cold rolling manufacturability. Therefore, the P content is set in a range of 0.0050% to 0.50%. The P content is preferably in a range of 0.03% to 0.15%.

Mo: 0.01% to 0.50%

Mo has an effect of suppressing scabs after hot rolling by, for example, suppressing cracking caused by temperature change during slab reheating. When the Mo content is less than 0.01%, the effect of suppressing scabs is small. When the Mo content exceeds 0.50%, a large amount of Mo may remain in the steel sheet after final annealing because of, for example, formation of carbides and nitrides, and the remaining Mo may cause deterioration of iron loss. Therefore, the Mo content is set in a range of 0.01% to 0.50%. The Mo content is preferably in a range of 0.02% to 0.15%.

B: 0.0001% to 0.0050%

B, in some cases, has an effect of suppressing grain growth and stabilizing secondary recrystallization by, for example, being combined with nitrogen in the steel to form precipitates or segregating itself, although the effect is slight. When the B content is less than 0.0001%, the effect is not sufficient. When the B content exceeds 0.0050%, the formed precipitates remain excessively even after purification, which causes deterioration of magnetic properties. Therefore, the B content is set in a range of 0.0001% to 0.0050%. The B content is preferably in a range of 0.0003% to 0.0030%.

According to the above, the steel slab contains three or more selected from Sn, Sb, Cr, P, Mo and B within the above ranges. However, as described above, the contents of Sn, Sb, Cr, P, Mo and B in the steel composition of the steel sheet after final annealing are required to satisfy the above-mentioned relational expression (1).

For example, in a case where an annealing separator mainly composed of MgO is used as the annealing separator to form a forsterite film on the surface of the steel sheet, it is possible to satisfy the range of the above-mentioned relational expression (1) for the steel sheet after final annealing by containing three or more selected from Sn, Sb, Cr, P, Mo and B within the above ranges in the steel slab, controlling the contents of these elements to satisfy the following relational expression (2), and appropriately controlling a set of conditions of secondary recrystallization annealing, which will be described later, and a set of conditions of primary recrystallization annealing.

$$0.16 \leq [\% \text{ Sn}] + [\% \text{ Sb}] + [\% \text{ Cr}] + 2 \times [\% \text{ P}] + [\% \text{ Mo}] + [\% \text{ B}] \quad (2)$$

where [% Sn], [% Sb], [% Cr], [% P], [% Mo] and [% B] each indicate the contents of Sn, Sb, Cr, P, Mo and B (mass %) in the steel.

In addition to the basic components described above, for the purpose of improving magnetic properties more stably on an industrial scale, the following elements may be appropriately contained as required.

Ni: 0.005% to 1.5%

Ni provides an effect of improving magnetic properties by enhancing microstructure uniformity of hot rolled sheet. To obtain this effect, the Ni content is preferably 0.005% or more. However, when the Ni content exceeds 1.5%, it becomes difficult to develop secondary recrystallization, and magnetic properties deteriorate. Therefore, the Ni content is desirably in a range of 0.005% to 1.5%.

Cu: 0.01% to 0.50%

Cu provides an effect of effectively improving magnetic properties by suppressing oxidization of steel sheet during secondary recrystallization annealing and facilitating secondary recrystallization of crystal grains having good crystal orientation. To obtain this effect, the Cu content is preferably 0.01% or more. However, when the Cu content exceeds 0.50%, hot rolling manufacturability deteriorates. Therefore, the Cu content is desirably in a range of 0.01% to 0.50%.

Nb: 0.0005% to 0.0100%

Nb is similar to Mo, and has an effect of suppressing scabs after hot rolling by, for example, suppressing cracking caused by temperature change during slab reheating. When the Nb content is less than 0.0005%, the effect of suppressing scabs is small. When the Nb content exceeds 0.0100%, a large amount of Nb may remain in the steel sheet after final annealing because of, for example, formation of carbides and nitrides, and the remaining Nb may cause deterioration of iron loss. Therefore, the Nb content is desirably in a range of 0.0005% to 0.0100%.

Ti: 0.0005% to 0.0100% and Bi: 0.0005% to 0.0100%

These elements, in some cases, function as auxiliary inhibitors and provide an effect of stabilizing secondary recrystallization. When the content of each of these elements is less than 0.0005%, the effect as an auxiliary inhibitor is small. When the content of each of these elements exceeds 0.0100%, the formed precipitates still remain even after purification, which may cause deterioration of magnetic properties or deterioration of bend property by embrittling grain boundaries. Therefore, the Ti and Bi contents are each desirably in a range of 0.0005% to 0.0100%.

The balance other than the above components is Fe and inevitable impurities.

The steel composition of the grain-oriented electrical steel sheet of the disclosure preferably contains, in mass % or mass ppm, C: 0.005% or less, Si: 2.0% to 5.0%, Mn: 0.01% to 0.5%, sol.Al: 10 ppm or less, N: 15 ppm or less, S and Se each in an amount of 10 ppm or less, and three or more selected from Sn, Sb, Cr, P, Mo and B whose contents satisfy the above relational expression (1), and further contains one or two or more selected from Ni: 0.005% to 1.50%, Cu: 0.01% to 0.50%, Nb: 0.0005% to 0.0100%, Ti: 0.0005% to 0.0100%, and Bi: 0.0005% to 0.0100% as required, the balance being Fe and inevitable impurities.

A steel slab used in the method for manufacturing a grain-oriented electrical steel sheet of the disclosure preferably contains: C: 0.10% or less, Si: 2.0% to 5.0%, and Mn: 0.01% to 0.5%, suppresses S, Se and O each to less than 50 ppm, sol.Al to less than 100 ppm, N to 80 ppm or less, further contains three or more selected from Sn: 0.01% to 0.50%, Sb: 0.005% to 0.50%, Cr: 0.01% to 1.50%, P: 0.0050% to 0.50%, Mo: 0.01% to 0.50% and B: 0.0001% to 0.0100% whose contents satisfy the above relational expression (2), and further contains one or two or more selected from Ni: 0.005% to 1.50%, Cu: 0.01% to 0.50%, Nb: 0.0005% to 0.0100%, Ti: 0.0005% to 0.0100%, and Bi: 0.0005% to 0.0100% as required, the balance being Fe and inevitable impurities.

Furthermore, in the method of manufacturing a grain-oriented electrical steel sheet of the disclosure, the steel slab containing the above chemical composition is subjected to hot rolling without heating or after heating to obtain a hot rolled sheet. Since the slab contains a chemical composition that does not have any strong inhibitor component, suppressing the temperature of the slab reheating before hot rolling to 1300° C. or lower is particularly effective in reducing the amount of scale generated during the hot rolling. It is desirable to lower the slab reheating temperature in order to realize a uniformly homogenized primary recrystallized microstructure in which the crystal microstructure is refined and the harmful effects of the inhibitor components inevitably mixed are rendered harmless.

The hot rolled steel sheet is then subjected to hot band annealing as required. When performing the hot band annealing, the hot band annealing temperature is preferably in a range of 800° C. to 1100° C. in order to highly develop the Goss texture of the product sheet. When the hot band annealing temperature is lower than 800° C., there remains a band structure resulting from the hot rolling, which makes it difficult to obtain a homogenized primary recrystallized microstructure, and accordingly the growth of secondary recrystallization is inhibited. On the other hand, when the hot band annealing temperature exceeds 1100° C., the grain size becomes too large after hot band annealing because of the absence of strong inhibitors, which makes it difficult to obtain a homogenized primary recrystallized microstructure.

Subsequently, the hot rolled sheet is subjected to cold rolling once, or twice or more with intermediate annealing performed therebetween to obtain a cold rolled sheet. Regarding the cold rolling, it is effective to perform the rolling after the rolling temperature has been increased to a range of 100° C. to 250° C., or to perform aging treatment in a range of 100° C. to 250° C. one or more times during the cold rolling in order to develop the Goss texture. When reheating the slab, the reheating temperature is desirably around 1000° C. or higher and 1300° C. or lower.

The resulting cold rolled sheet is subjected to primary recrystallization annealing. The aim of the primary recrystallization annealing is to cause the primary recrystallization of the cold rolled sheet having a rolled microstructure, so that an optimal primary recrystallized grain size for secondary recrystallization is obtained. For this aim, the annealing temperature of the primary recrystallization annealing is desirably around 800° C. or higher and lower than 950° C. Decarburization annealing may be performed at the same time by using wet hydrogen-nitrogen atmosphere or wet hydrogen-argon atmosphere as the annealing atmosphere.

During the primary recrystallization annealing, the average heating rate at a temperature range of 500° C. to 700° C. is preferably set to 50° C./s or higher.

As described in JP H7-62436 A (PTL 8), it is known that when inhibitor components such as S or Se are contained in a steel slab, increasing the heating rate at the above temperature range enhances the amount of Goss orientation to decrease the crystal grain size after secondary recrystallization, and thereby the iron loss is improved. Since the above temperature range is a temperature range corresponding to the recovery of microstructure after cold rolling, it is considered that rapid heating curbs the recovery and facilitates the recrystallization, and accordingly such effect is obtained.

However, a completely different effect is obtained here. That is to say, by changing the shape of $SiO_2$ in the subscale and forming a forsterite film, Sn, Sb, Cr, P and Mo, which are the above-mentioned grain boundary segregation type elements other than B, can be retained in the steel.

Primary recrystallization annealing is usually performed in wet hydrogen atmosphere. This is for the purpose of facilitating the decarburization as well as the primary recrystallization, and promoting the formation of a $SiO_2$ layer called subscale on the surface of the steel sheet. Although $SiO_2$, in a case of using an annealing separator mainly composed of MgO, reacts with MgO to form $Mg_2SiO_4$, i.e. forsterite, the shape and amount of $SiO_2$ are affected by the characteristics of the forsterite film such as reactivity and thickness. Generally, when oxidation takes place in the residual recovered microstructure of dislocations, oxygen tends to diffuse along the dislocations, and the $SiO_2$ to be formed also tends to form in a shape along the dislocations. On the other hand, oxygen diffuses along the dense face of the crystal when the diffusion takes place after recrystallization. In this case, the subscale layer formed of $SiO_2$ tends to be thick, the $SiO_2$ has a nearly spherical shape and a relatively high reactivity, and the oxygen content in the steel tends to be high.

On the other hand, the purification of steel is performed in a form of release to gas-phase or concentration to forsterite film. Therefore, when the temperature at which the forsterite film forms changes, the purification is also affected. Of course, release to gas-phase is easier to proceed at a stage where the steel sheet has not been covered by the forsterite film. The above-mentioned grain boundary segregation type elements other than B, which means Sn, Sb, Cr, P and Mo, are substitutional elements, and therefore have a slow diffusing rate and are difficult to be purified. Accordingly, in a case where the forsterite film forms at a lower temperature, the release of elements, particularly these elements having a slow diffusion rate, to the gas phase becomes difficult to proceed. Furthermore, although the concentration to the forsterite film should be performed together with the formation of the forsterite film, the elements are impossible to diffuse to the forsterite film if the forsterite film forms at a low temperature, which renders the concentration to the forsterite film difficult.

In contrast, N and C, which form precipitates to cause deterioration of magnetic properties even in a trace residual amount, are invasive elements, and accordingly have a fast diffusion rate. Furthermore, since N and C tend to be gas themselves, the release to gas-phase is easy to proceed. That is to say, by appropriately controlling the temperature at which the forsterite film forms, it is possible to create a state where only the above-mentioned necessary elements other than N and C can easily be retained in the steel.

As described above, in a case where a steel slab containing the above-mentioned composition is used and a forsterite film is formed by using an annealing separator mainly composed of MgO, setting the average heating rate at a temperature range of 500° C. to 700° C. to 50° C./s or higher and appropriately controlling the secondary recrystallization annealing conditions, which will be described later, changes the shape of $SiO_2$ in the subscale and promotes the formation of forsterite film, and accordingly it is possible to retain Sn, Sb, Cr, P and Mo, which are the above-mentioned grain boundary segregation type elements other than B, in the steel. Thereby, it is possible to control the contents of Sn, Sb, Cr, P, Mo and B in the range of relational expression (1).

For this reason, the average heating rate at a temperature range of 500° C. to 700° C. is preferably 50° C./s or higher during the primary recrystallization annealing. The average heating rate is more preferably 100° C./s or higher. The upper limit of the average heating rate is not particularly limited, yet it is usually around 200° C./s.

Nitriding treatment can be performed during the primary recrystallization annealing, or after the annealing and before applying the annealing separator. As described in WO 2014/104394 (PTL 9), performing nitriding treatment can stabilize secondary recrystallization even with a chemical composition containing almost no inhibitor component. However, since nitriding affects the components themselves in the steel and brings residual nitride-forming elements after purification, a set of conditions is required in order to perform the nitriding.

Among Sn, Sb, Cr, P, Mo and B, i.e. the above-mentioned grain boundary segregation type elements, B, Mo and Cr combine with nitrogen and form nitrides that tend to be stable even in a high temperature. Actually, nitriding should not be performed in a case where the steel slab contains B, Mo and Cr exceeding a range of B: 0.001 mass %, Mo: 0.05 mass %, and Cr: 0.10 mass %. The reason is that when performing nitriding in this case, these elements may remain as they are in the purified steel sheet after final annealing, and magnetic properties may deteriorate.

The nitriding treatment method is not particularly limited. For example, gas nitriding may be performed directly in the form of a coil using $NH_3$ atmosphere or gas, or continuous gas nitriding may be performed on a running strip. It is also possible to utilize salt bath nitriding with higher nitriding ability than gas nitriding. A preferred salt bath for salt bath nitriding is a salt bath mainly composed of cyanate. Regarding the nitriding temperature and nitriding time, it is preferable at 500° C. to 1000° C. for around 20 seconds to 600 seconds for gas nitriding, and at 300° C. to 600° C. for around 20 seconds to 600 seconds for salt bath nitriding.

The annealing separator is applied to the surface of the resulting steel sheet after primary recrystallization annealing or nitriding treatment. In order to obtain the effect of retaining the grain boundary segregation type elements of Sn, Sb, Cr, P and Mo in the steel by the formation of forsterite film described above, it is necessary to use magnesia, i.e. MgO as the main agent of the annealing separator. The compounds described in PTLs 6 and 7 such as Sr compound, Ca compound, Ba compound and Ti compound are not required to be added to the annealing separator. However, these compounds can be appropriately used within an advantageous range to the formation of forsterite film.

A specific annealing separation additive changes the forming rate of forsterite film. As a result, the purification of steel is affected in a way similar to the above mechanism. Although the details of secondary recrystallization annealing conditions will be described later, at a temperature range of 500° C. or higher and 1000° C. or lower where $SiO_2$ forms into olivine, providing some degree of oxidation properties can promote the formation of forsterite film. For example, addition of an annealing separation additive having sulfate groups can effectively improve the atmosphere oxidation properties at an appropriate temperature range because that the added annealing separation additive having sulfate groups decomposes at around 700° C. to improve the oxidation properties. The effect is obtainable even in a relatively small amount. However, when the annealing separation additive is less than 1 part by mass with respect to 100 parts by mass of MgO, the effect is small. On the other hand, when the added annealing separation additive is more than 30 parts by mass, the oxidation properties become too high and the forsterite film becomes too thick, which deteriorates the bending and peeling properties of the forsterite film. On the contrary, some compounds may be decomposed or reduced during the annealing, and thereby enter into the steel as pure metal. Since the silicon nitrides precipitate at the grain boundaries during the cooling after purification annealing, the entering into the steel before the precipitation also effectively improves the bend property. Examples of the elements that relatively tend to be decomposed or reduced and relatively tend to enter into the steel include Sn and Sb. It is preferable to use compounds of these elements.

Subsequently, secondary recrystallization annealing which also serves as purification annealing is performed.

During the secondary recrystallization annealing, the average heating rate at a temperature range of 800° C. to 900° C. is set to 5° C./hour or lower. This is for the purpose of suppressing the purification of grain boundary segregation type elements, which can be achieved by promoting the formation of forsterite film at a lower temperature.

That is to say, Sn, Sb, Cr, P and Mo, which are substitutional elements, have a low diffusion rate at this temperature range, and at the same time, since the reaction in which $SiO_2$ forms into olivine proceeds at this temperature range, it is possible to change the shape of $SiO_2$ in the subscale by setting the average heating rate at this temperature range to 5° C./hour or lower and staying at this temperature range for a long time, specifically 20 hours or longer. As a result, Sn, Sb, Cr, P and Mo are easier to to be retained in the steel because of the formation of forsterite film. The average heating rate at this temperature range is preferably 3° C./hour or lower. The lower limit of the average heating rate at this temperature range is not particularly limited. However, from the perspective of productivity, the average heating rate is preferably 1° C./hour or higher.

During the secondary recrystallization annealing, the gas composition of the atmosphere at a temperature range of 1000° C. or higher and lower than 1100° C. contains $H_2$: 10 vol % or more.

That is to say, within this temperature range, $H_2$ gas promotes the formation of forsterite film, and particularly a $H_2$ concentration of 10 vol % or more can retain Sn, Sb, Cr, P and Mo in the steel through the formation of forsterite film described above. The $H_2$ concentration is more preferably $H_2$: 25 vol % or more. Examples of contained gases other than $H_2$ gas include $N_2$ and Ar. However, $H_2$ may be 100 vol %.

Furthermore, by setting the purification temperature during the secondary recrystallization annealing to a temperature exceeding 1180° C. and using $H_2$ gas atmosphere, for example, a gas atmosphere with $H_2$: 10 vol % or more as the gas atmosphere during the purification, it is possible to thoroughly purify C and N, which are harmful to magnetic properties even in trace amounts, and other components such as Al, S and Se.

The purification time is not particularly limited, yet it is usually around 2 hours to 20 hours.

In a conventional case where grain-oriented electrical steel sheets were manufactured using a slab containing a composition with reduced S and Se, using a reducing atmosphere such as $H_2$ gas as the atmosphere at a high temperature would lead to reduction of oxidized grain boundaries. The reduction was a starting point of precipitation of silicon nitride at grain boundaries, and therefore deteriorated the bend property.

In this regard, this disclosure uses grain boundary segregation type elements of Sn, Sb, Cr, P, Mo and B to suppress the segregation of silicon nitride to grain boundaries, and therefore high-temperature purification annealing in $H_2$ atmosphere, which provides more thorough purification, becomes possible. The high-temperature purification annealing in H2 atmosphere was not applicable in conventional cases because it induces deterioration of bend property with a chemical composition containing suppressed S and Se.

As a result, elements such as Al, N, S, and Se contained in the steel composition of the steel sheet after final annealing can be reduced to 10 ppm or less of Al, 15 ppm or less of N, and 10 ppm or less of total amount of S and Se. While these four elements of Al, N, S and Se are released to gas-phase, a part of them concentrate to the forsterite film. Therefore, Al is 50 ppm or less, N is 100 ppm or less, and the total amount of S and Se is 50 ppm or less when being analyzed with an attached forsterite film.

In a case where the purification temperature is lowered to around 1100° C. or the atmosphere is Ar atmosphere or the like, the purification is insufficient, and the steel composition of the final steel sheet after the purification, i.e. the secondary recrystallization annealing cannot be adjusted to a state where sol. Al is 10 ppm or less, N is 15 ppm or less, and the total amount of S and Se is 10 ppm or less.

As described above, for the grain-oriented electrical steel sheet of the disclosure, it is important to appropriately control the contents of Sn, Sb, Cr, P, Mo and B, and at the same time to suppress sol.Al to 10 ppm or less, N to 15 ppm or less, the total amount of S and Se to 10 ppm or less.

After the secondary recrystallization annealing, an insulating coating may be applied to the surface of the steel sheet and baked. The type of the applied insulating coating is not particularly limited, and may be any conventionally well-known insulating coating. For example, preferred methods are described in JP S50-79442 A and JP S48-39338 A where coating liquid containing phosphate-chromate-colloidal silica is applied on a steel sheet and then baked at a temperature of around 800° C.

Furthermore, flattening annealing may be performed to arrange the shape of the steel sheet. This flattening annealing may also serve as the insulating coating baking treatment.

EXAMPLES

Example 1

Steel ingots that contain, in mass % or mass ppm, C: 0.06%, Si: 3.25%, Mn: 0.06% as basic components and further contain the components listed in Table 2 with the balance being Fe and inevitable impurities were obtained by steelmaking. Some of the steel ingots were made by further adding Ni, Cu, Nb, Ti and Bi. The obtained steel ingot was heated to 1200° C., and subjected to hot rolling to obtain a hot rolled sheet with a thickness of 2.5 mm. The hot rolled sheet was annealed at 1020° C. for 30 seconds and then rolled to 0.30 mm to obtain a cold rolled sheet. Subsequently, the cold rolled sheet was subjected to primary recrystallization annealing, i.e. decarburization annealing where the atmosphere was wet hydrogen atmosphere, the average heating rate at a temperature range of 500° C. to 700° C. was 120° C./s, the annealing temperature was 850° C., and the annealing time was 60 seconds. Slurry, prepared by adding MgO as a main agent and the agent in Table 1 as an additive, was applied to the steel sheet resulting from the primary recrystallization annealing as an annealing separator, and was dried. Subsequently, the steel sheet was kept at a temperature range of 800° C. to 900° C. where the atmosphere was $N_2$ atmosphere for 30 hours or more. After changing the atmosphere to $H_2$ atmosphere, the steel sheet was heated to 1200° C., and subjected to secondary recrystallization annealing at this temperature with a soaking time of 10 hours in the $H_2$ atmosphere. For comparison, No. 5 was kept at the temperature range of 800° C. to 900° C. for 10 hours during the secondary recrystallization annealing. Subsequently, a phosphate-based insulation tension coating was applied to the surface of the steel sheet and baked.

An Epstein test piece was taken from the resulting steel sheet and the the magnetic flux density $B_8$ thereof was evaluated.

Additionally, the resulting steel sheet was cut out to a size specified in JIS C 2553 and bent repeatedly at a right angle under a tension of 70 N. The number of times until a crack occurs in the steel sheet was measured to evaluate the bend property. The measurement was carried out with the maximum number of times of bending being 10. The results are listed in Table 2.

In a case where the number of times of bending reaches ten with no crack occurring, the number of times of repeated bending is indicated as "10 or more".

The content of trace elements in the steel was measured after removing the insulating coating and forsterite film on the surface of the steel sheet. The results are also listed in Table 2. The content of trace elements in the steel was measured by atomic absorption spectrometry. The C content was reduced to 0.003 mass % or less, and the Si content and the Mn content were almost the same as those in the steel slab.

Moreover, the surface of the resulting steel sheet was polished and etched with nital, ten locations were observed at 100 times magnification under an optical microscope, the total grain boundary length as well as the total grain boundary silicon nitride length of each location were measured, and the ratio of the total grain boundary length of the crystal grain boundaries at which silicon nitrides precipitate to the total grain boundary length of crystal grain boundaries, i.e. (total grain boundary silicon nitride length)/(total grain boundary length)×100 was calculated. The results are also listed in Table 2.

TABLE 2

| No. | Additive to annealing separator | Addition amount of additive to annealing separator with respect to 100 parts by mass of MgO (parts by mass) | | Steel composition (mass %) | | | | | | | | |
|---|---|---|---|---|---|---|---|---|---|---|---|---|
| | | | | sol-Al | N | S | Se | O | Sn | Sb | Cr | P |
| 1 | — | — | Slab | 0.0040 | 0.0040 | 0.0030 | 0.0010 | 0.0030 | — | — | 0.050 | 0.010 |
| | | | Steel sheet after final annealing | 0.0003 | 0.0010 | 0.0004 | 0.0001 | 0.0010 | — | — | 0.031 | 0.008 |
| 2 | — | — | Slab | 0.0050 | 0.0050 | 0.0030 | 0.0005 | 0.0020 | — | 0.050 | 0.050 | 0.080 |
| | | | Steel sheet after final annealing | 0.0002 | 0.0010 | 0.0004 | 0.0001 | 0.0010 | — | 0.038 | 0.033 | 0.049 |
| 3 | — | — | Slab | 0.0060 | 0.0060 | 0.0020 | 0.0001 | 0.0010 | — | 0.040 | 0.050 | 0.080 |
| | | | Steel sheet after final annealing | 0.0001 | 0.0010 | 0.0004 | 0.0001 | 0.0010 | — | 0.037 | 0.032 | 0.049 |
| 4 | $MgSO_4$ | 5 | Slab | 0.0070 | 0.0050 | 0.0030 | 0.0002 | 0.0030 | — | 0.040 | 0.050 | 0.080 |
| | | | Steel sheet after final annealing | 0.0001 | 0.0010 | 0.0006 | 0.0001 | 0.0010 | — | 0.037 | 0.032 | 0.049 |
| 5 | — | — | Slab | 0.0080 | 0.0040 | 0.0020 | 0.0003 | 0.0020 | 0.060 | — | 0.050 | 0.050 |
| | | | Steel sheet after final annealing | 0.0003 | 0.0010 | 0.0004 | 0.0001 | 0.0010 | 0.041 | — | 0.035 | 0.037 |
| 6 | — | — | Slab | 0.0090 | 0.0030 | 0.0040 | 0.0004 | 0.0010 | 0.060 | — | 0.060 | 0.050 |
| | | | Steel sheet after final annealing | 0.0003 | 0.0010 | 0.0004 | 0.0001 | 0.0010 | 0.042 | — | 0.044 | 0.038 |
| 7 | $Sb_2O_3$ | 3 | Slab | 0.0080 | 0.0040 | 0.0020 | 0.0010 | 0.0040 | 0.060 | 0.020 | 0.050 | 0.050 |
| | | | Steel sheet after final annealing | 0.0003 | 0.0010 | 0.0004 | 0.0001 | 0.0020 | 0.043 | 0.012 | 0.036 | 0.037 |
| 8 | $Sb_2O_3$ | 3 | Slab | 0.0070 | 0.0030 | 0.0030 | 0.0008 | 0.0030 | 0.060 | 0.020 | 0.070 | 0.050 |
| | | | Steel sheet after final annealing | 0.0003 | 0.0010 | 0.0004 | 0.0001 | 0.0010 | 0.040 | 0.011 | 0.045 | 0.037 |
| 9 | — | — | Slab | 0.0060 | 0.0020 | 0.0010 | 0.0010 | 0.0020 | — | 0.080 | 0.040 | 0.010 |
| | | | Steel sheet after final annealing | 0.0002 | 0.0010 | 0.0003 | 0.0001 | 0.0010 | — | 0.062 | 0.025 | 0.008 |
| 10 | — | — | Slab | 0.0050 | 0.0030 | 0.0040 | 0.0002 | 0.0030 | — | 0.080 | 0.040 | 0.050 |
| | | | Steel sheet after final annealing | 0.0002 | 0.0010 | 0.0003 | 0.0001 | 0.0010 | — | 0.063 | 0.022 | 0.038 |
| 11 | — | — | Slab | 0.0040 | 0.0040 | 0.0030 | 0.0010 | 0.0030 | — | 0.080 | 0.040 | 0.050 |
| | | | Steel sheet after final annealing | 0.0002 | 0.0010 | 0.0003 | 0.0001 | 0.0010 | — | 0.060 | 0.024 | 0.039 |
| 12 | — | — | Slab | 0.0030 | 0.0030 | 0.0040 | 0.0001 | 0.0020 | — | 0.080 | 0.040 | 0.050 |
| | | | Steel sheet after final annealing | 0.0002 | 0.0010 | 0.0003 | 0.0001 | 0.0010 | — | 0.062 | 0.024 | 0.040 |
| 13 | SnO | 4 | Slab | 0.0040 | 0.0040 | 0.0030 | 0.0020 | 0.0020 | 0.020 | 0.070 | 0.040 | 0.050 |
| | | | Steel sheet after final annealing | 0.0002 | 0.0010 | 0.0004 | 0.0001 | 0.0010 | 0.007 | 0.055 | 0.024 | 0.038 |
| 14 | SnO | 4 | Slab | 0.0050 | 0.0050 | 0.0040 | 0.0010 | 0.0040 | 0.020 | 0.070 | 0.040 | 0.050 |
| | | | Steel sheet after final annealing | 0.0002 | 0.0010 | 0.0003 | 0.0001 | 0.0010 | 0.008 | 0.054 | 0.026 | 0.036 |
| 15 | — | — | Slab | 0.0050 | 0.0050 | 0.0030 | 0.0005 | 0.0020 | — | 0.100 | — | — |
| | | | Steel sheet after final annealing | 0.0002 | 0.0010 | 0.0004 | 0.0001 | 0.0010 | — | 0.090 | — | — |

| No. | Additive to annealing separator | Addition amount of additive to annealing separator with respect to 100 parts by mass of MgO (parts by mass) | | Steel composition (mass %) | | | [Sn] + [Sb] + [Cr] + 2 × [P] + [Mo] + [B] (mass %) | Ratio of total length of grain boundaries at which silicon nitrides precipitate to total grain boundary length (%) | $B_8$ (T) | Repeated bending times | Remarks |
|---|---|---|---|---|---|---|---|---|---|---|---|
| | | | | Mo | B | Ni, Cu, Nb, Ti, Bi | | | | | |
| 1 | — | — | Slab | — | — | — | 0.070 | 2.5 | 1.902 | 0 | Comparative example |
| | | | Steel sheet after final annealing | — | — | — | 0.047 | | | | |
| 2 | — | — | Slab | 0.050 | — | — | 0.310 | 0.0 | 1.911 | 10 or more | Present example |
| | | | Steel sheet after final annealing | 0.040 | — | — | 0.209 | | | | |
| 3 | — | — | Slab | 0.010 | — | Cu: 0.04, Ti: 0.0020 | 0.260 | 0.1 | 1.920 | 10 or more | Present example |
| | | | Steel sheet | 0.005 | — | Cu: 0.03, | 0.172 | | | | |

TABLE 2-continued

| No. | Additive | Amount | Sample | Col A | Col B | Other elements | Col C | Col D | Col E | Col F | Classification |
|---|---|---|---|---|---|---|---|---|---|---|---|
| | | | after final annealing | | | Ti: 0.0011 | | | | | |
| 4 | MgSO$_4$ | 5 | Slab | 0.030 | — | Cu: 0.04, Ti: 0.0020 | 0.280 | 0.1 | 1.922 | 10 or more | Present example |
| | | | Steel sheet after final annealing | 0.020 | — | Cu: 0.03, Ti: 0.0011 | 0.187 | | | | |
| 5 | — | — | Slab | — | 0.0015 | — | 0.2115 | 1.5 | 1.905 | 7 | Comparative example |
| | | | Steel sheet after final annealing | — | 0.0010 | — | 0.1510 | | | | |
| 6 | — | — | Slab | — | 0.0014 | — | 0.2214 | 0.1 | 1.908 | 10 or more | Present example |
| | | | Steel sheet after final annealing | — | 0.0010 | — | 0.1630 | | | | |
| 7 | Sb$_2$O$_3$ | 3 | Slab | — | 0.0018 | — | 0.2318 | 0.1 | 1.909 | 10 or more | Present example |
| | | | Steel sheet after final annealing | — | 0.0010 | — | 0.1660 | | | | |
| 8 | Sb$_2$O$_3$ | 3 | Slab | — | 0.0011 | Ni: 0.05 | 0.2511 | 0.0 | 1.915 | 10 or more | Present example |
| | | | Steel sheet after final annealing | — | 0.0010 | Ni: 0.04 | 0.1710 | | | | |
| 9 | — | — | Slab | — | — | — | 0.140 | 1.2 | 1.908 | 2 | Comparative example |
| | | | Steel sheet after final annealing | — | — | — | 0.103 | | | | |
| 10 | — | — | Slab | — | — | — | 0.220 | 0.0 | 1.910 | 10 or more | Present example |
| | | | Steel sheet after final annealing | — | — | — | 0.161 | | | | |
| 11 | — | — | Slab | — | — | Nb: 0.0008 | 0.220 | 0.1 | 1.918 | 10 or more | Present example |
| | | | Steel sheet after final annealing | — | — | Nb: 0.0007 | 0.162 | | | | |
| 12 | — | — | Slab | — | — | Br: 0.0008 | 0.220 | 0.2 | 1.917 | 10 or more | Present example |
| | | | Steel sheet after final annealing | — | — | Br: 0.0006 | 0.166 | | | | |
| 13 | SnO | 4 | Slab | — | — | Ni: 0.05, Cu: 0.08 | 0.230 | 0.1 | 1.922 | 10 or more | Present example |
| | | | Steel sheet after final annealing | — | — | Ni: 0.04, Cu: 0.07 | 0.162 | | | | |
| 14 | SnO | 4 | Slab | — | — | Ni: 0.05, Cu: 0.08 | 0.230 | 0.2 | 1.924 | 10 or more | Present example |
| | | | Steel sheet after final annealing | — | — | Ni: 0.04, Cu: 0.07 | 0.160 | | | | |
| 15 | — | — | Slab | 0.100 | — | — | 0.200 | 2.3 | 1.913 | 3 | Comparative example |
| | | | Steel sheet after final annealing | 0.090 | — | — | 0.180 | | | | |

According Table 2, it is understood that the bend property is significantly improved in the present examples as compared with the comparative examples.

Example 2

A silicon steel sheet slab containing, in mass % or mass ppm, C: 0.04%, Si: 3.11%, Mn: 0.03%, sol.Al: 50 ppm, N: 38 ppm, S: 21 ppm, O: 9 ppm, Sb: 0.053%, Cr: 0.052%, P: 0.056% with the balance being Fe and inevitable impurities was prepared. The silicon steel sheet slab was heated at 1200° C. for 50 minutes and then subjected to hot rolling to obtain a hot rolled sheet with a thickness of 2.2 mm. The hot rolled sheet was annealed at 1000° C. for 40 seconds. Subsequently, the hot rolled sheet was subjected to cold rolling to obtain a thickness of 1.7 mm, and then intermediate annealed at 1100° C. for 1 minute. Subsequently, the hot rolled sheet was further subjected to cold rolling to obtain a cold rolled sheet with a final sheet thickness of 0.23 mm. Subsequently, in an atmosphere whose $PH_2O/PH_2$ was 0.3, the cold rolled sheet was subjected to primary recrystallization annealing, i.e. decarburization annealing where the average heating rate at a temperature range of 500° C. to 700° C. was 150° C./s, the annealing temperature was 820° C., and the annealing time was 2 minutes. The steel sheet resulting from the primary recrystallization annealing was subjected to nitriding treatment in a mixed atmosphere of $NH_3$, $H_2$, and $N_2$ to increase the N content in the steel to 260 ppm. Subsequently, slurry prepared by mixing an annealing separator and water was applied to the surface of the steel sheet, where the annealing separator contains MgO as a main component and was added with 3 parts by mass of Mg(OH)$_2$ with respect to 100 parts by mass of MgO. Subsequently, the steel sheet was coiled, and kept at a temperature range of 800° C. to 900° C. for 30 hours, where the atmosphere was $N_2$ atmosphere. After changing the atmosphere to $H_2$ atmosphere, the steel sheet was heated to 1220° C., and subjected to secondary recrystallization annealing at this temperature with a soaking time of 20 hours in the $H_2$ atmosphere. Subsequently, a phosphate-based insulating tension coating was applied to the surface of the steel sheet and baked, and flattening annealing was performed to flatten the steel strip to obtain a final steel sheet.

An Epstein test piece was taken from the resulting steel sheet and the the magnetic flux density $B_8$ thereof was evaluated. Additionally, the resulting steel sheet was cut out to a size specified in JIS C 2553 and bent repeatedly at a right angle under a tension of 70 N. The number of times until a crack occurs in the steel sheet was measured to evaluate the bend property. The measurement was carried out with the maximum number of times of bending being 10. The results are listed in Table 3.

In a case where the number of times of bending reaches ten with no crack occurring, the number of times of repeated bending is indicated as "10 or more".

The content of trace elements in the steel was measured after removing the insulating coating and forsterite film on the surface of the steel sheet. The results are listed in Table 3. The C content was reduced to 0.003% or less, and the Si content, the Mn content and the O content were almost the same as those in the steel slab.

Similar to Experiment 1, the ratio of the total grain boundary length of the crystal grain boundaries at which silicon nitrides precipitate to the total grain boundary length of crystal grain boundaries was calculated. The results are also listed in Table 3.

rolled sheet was subjected to hot band annealing for 1 minute at 980° C. and then to cold rolling to obtain a cold rolled sheet with a thickness of 0.23 mm. The resulting cold rolled sheet was heated at the heating rate listed in Table 4, and subjected to primary recrystallization annealing where the annealing temperature is 840° C. and the annealing time is 2 minutes. After being applied with an annealing separator mainly composed of MgO, the steel sheet was subjected to secondary recrystallization annealing under the set of conditions listed in Table 4 in a laboratory annealing furnace capable of controlling the gas atmosphere. During the secondary recrystallization annealing, the steel sheet was kept at a temperature range of 800° C. to 900° C. for 50 hours where the atmosphere is $N_2$ atmosphere, and then, after changing the atmosphere to $H_2$ atmosphere at a temperature of 900° C. or higher, the steel sheet was heated to 1200° C., and soaked for 10 hours at this temperature in the $H_2$ atmosphere. For comparison, No. 10 was kept at the temperature range of 800° C. to 900° C. for 10 hours during the secondary recrystallization annealing. Subsequently, a phosphate-based insulating tension coating was applied to the surface of the steel sheet and baked, and flattening annealing was performed to flatten the steel strip to obtain a final steel sheet.

An Epstein test piece was taken from the resulting steel sheet and the the magnetic flux density $B_8$ thereof was

TABLE 3

| Steel composition of the steel sheet after final annealing (mass %) | | | | | | [Sn] + [Sb] + [Cr] + 2 × [P] + [Mo] + [B] | $B_8$ | Repeated | Ratio of total length of grain boundaries at which silicon nitrides precipitate to total grain boundary length | |
|---|---|---|---|---|---|---|---|---|---|---|
| sol-Al | N | S | Sb | Cr | P | (mass %) | (T) | bending times | (%) | Remarks |
| 0.0004 | 0.001 | 0.0004 | 0.042 | 0.049 | 0.044 | 0.179 | 1.914 | 10 or more | 0.2 | Present example |

As indicated in Table 3, in a case where nitriding treatment was performed, the difference between the Cr content in the slab composition and that in the post-purification composition was small, yet the components such as Sb and P decreased by 100 ppm or more after purification. Furthermore, it is understood that the measurement results of the components after purification satisfy the above relational expression (1), and the deterioration of bend property is suppressed, although during the secondary recrystallization annealing, the atmosphere at a temperature range within which the slurry of annealing separator releases moisture and oxidation proceeds was set to $N_2$ atmosphere, and the purification atmosphere was set to $H_2$ atmosphere, which is advantageous for purification but has a reducing effect with a chemical composition not containing S or Se.

Example 3

A vacuum steel ingot containing the components listed in Table 4 with the balance being Fe and inevitable impurities was obtained by steelmaking. The vacuum steel ingot was subjected to hot rolling to obtain a hot rolled sheet. The hot evaluated. Additionally, the resulting steel sheet was cut out to a size specified in JIS C 2553 and bent repeatedly at a right angle under a tension of 70 N. The number of times until a crack occurs in the steel sheet was measured to evaluate the bend property. The measurement was carried out with the maximum number of times of bending being 10. The results are listed in Table 4.

In a case where the number of times of bending reaches ten with no crack occurring, the number of times of repeated bending is indicated as "10 or more".

The content of trace elements in the steel was measured after removing the insulating coating and forsterite film on the surface of the steel sheet. The results are also listed in Table 4.

Similar to Experiment 1, the ratio of the total grain boundary length of the crystal grain boundaries at which silicon nitrides precipitate to the total grain boundary length of crystal grain boundaries was calculated. The results are also listed in Table 4.

TABLE 4

| No. | | C | Si | Mn | sol-Al | N | S | Se | O | Sn | Sb | Cr |
|---|---|---|---|---|---|---|---|---|---|---|---|---|
| 1 | Slab | 0.03 | 3.2 | 0.08 | 0.0080 | 0.0040 | 0.0030 | 0.0010 | 0.0010 | 0.040 | 0.030 | 0.060 |
| | Steel sheet after final annealing | 0.001 | 3.2 | 0.07 | 0.0001 | 0.0005 | 0.0004 | 0.0001 | 0.0010 | 0.030 | 0.020 | 0.050 |
| 2 | Slab | 0.05 | 3.1 | 0.10 | 0.0070 | 0.0040 | 0.0020 | 0.0020 | 0.0010 | 0.050 | 0.030 | 0.050 |
| | Steel sheet after final annealing | 0.003 | 3.1 | 0.09 | 0.0002 | 0.0007 | 0.0006 | 0.0002 | 0.0010 | 0.040 | 0.030 | 0.040 |
| 3 | Slab | 0.03 | 3.2 | 0.05 | 0.0090 | 0.0030 | 0.0030 | 0.0010 | 0.0010 | 0.060 | 0.040 | 0.070 |
| | Steel sheet after final annealing | 0.001 | 3.2 | 0.04 | 0.0003 | 0.0006 | 0.0006 | 0.0002 | 0.0010 | 0.050 | 0.030 | 0.050 |
| 4 | Slab | 0.03 | 3.2 | 0.06 | 0.0050 | 0.0020 | 0.0030 | 0.0010 | 0.0010 | 0.020 | 0.010 | 0.020 |
| | Steel sheet after final annealing | 0.001 | 3.2 | 0.05 | 0.0002 | 0.0004 | 0.0005 | 0.0002 | 0.0010 | 0.010 | 0.010 | 0.010 |
| 5 | Slab | 0.04 | 3.4 | 0.07 | 0.0030 | 0.0030 | 0.0030 | 0.0010 | 0.0010 | 0.080 | 0.050 | 0.030 |
| | Steel sheet after final annealing | 0.002 | 3.3 | 0.06 | 0.0001 | 0.0005 | 0.0004 | 0.0001 | 0.0010 | 0.050 | 0.030 | 0.020 |
| 6 | Slab | 0.03 | 3.6 | 0.15 | 0.0080 | 0.0020 | 0.0020 | 0.0010 | 0.0010 | 0.040 | 0.070 | 0.040 |
| | Steel sheet after final annealing | 0.002 | 3.4 | 0.13 | 0.0003 | 0.0005 | 0.0004 | 0.0001 | 0.0010 | 0.020 | 0.060 | 0.030 |
| 7 | Slab | 0.02 | 3.4 | 0.11 | 0.0040 | 0.0040 | 0.0010 | 0.0010 | 0.0010 | 0.020 | 0.050 | 0.080 |
| | Steel sheet after final annealing | 0.001 | 3.3 | 0.10 | 0.0001 | 0.0006 | 0.0002 | 0.0001 | 0.0010 | 0.010 | 0.040 | 0.060 |
| 8 | Slab | 0.04 | 3.5 | 0.06 | 0.0060 | 0.0050 | 0.0040 | 0.0010 | 0.0010 | 0.050 | 0.050 | 0.040 |
| | Steel sheet after final annealing | 0.002 | 3.4 | 0.06 | 0.0002 | 0.0009 | 0.0006 | 0.0001 | 0.0010 | 0.040 | 0.040 | 0.030 |
| 9 | Slab | 0.03 | 3.3 | 0.09 | 0.0050 | 0.0030 | 0.0030 | 0.0010 | 0.0010 | 0.100 | 0.030 | 0.070 |
| | Steel sheet after final annealing | 0.001 | 3.2 | 0.08 | 0.0002 | 0.0004 | 0.0004 | 0.0001 | 0.0010 | 0.080 | 0.030 | 0.050 |
| 10 | Slab | 0.03 | 3.3 | 0.06 | 0.0050 | 0.0030 | 0.0040 | 0.0010 | 0.0010 | 0.030 | 0.040 | 0.070 |
| | Steel sheet after final annealing | 0.001 | 3.2 | 0.05 | 0.0002 | 0.0004 | 0.0004 | 0.0001 | 0.0010 | 0.020 | 0.030 | 0.050 |

| No. | | P | Mo | B | Others | [Sn] + [Sb] + [Cr] + 2 × [P] + [Mo] + [B] (mass %) | Average heating rate from 500° C. to 700° C. during primary re-crystallization annealing (° C./s) | Ratio of total length of grain boundaries at which silicon nitrides precipitate to total grain boundary length (%) | $B_8$ (T) | Repeated bending times | Remarks |
|---|---|---|---|---|---|---|---|---|---|---|---|
| 1 | Slab | 0.060 | 0.030 | 0.0010 | — | 0.2810 | 20 | 0.2 | 1.912 | 10 or more | Present example |
| | Steel sheet after final annealing | 0.030 | 0.020 | 0.0005 | — | 0.1805 | | | | | |
| 2 | Slab | 0.050 | 0.030 | 0.0010 | — | 0.2610 | 150 | 0.1 | 1.924 | 10 or more | Present example |
| | Steel sheet after final annealing | 0.040 | 0.030 | 0.0007 | — | 0.2207 | | | | | |
| 3 | Slab | 0.070 | 0.030 | 0.0020 | — | 0.3420 | 300 | 0.1 | 1.929 | 10 or more | Present example |
| | Steel sheet after final annealing | 0.050 | 0.030 | 0.0009 | — | 0.2609 | | | | | |
| 4 | Slab | 0.020 | 0.010 | 0.0001 | — | 0.1001 | 150 | 1.5 | 1.900 | 0 | Comparative example |
| | Steel sheet after final annealing | 0.010 | 0.010 | 0.0001 | — | 0.0601 | | | | | |
| 5 | Slab | 0.080 | 0.050 | 0.0010 | Ni: 0.50 | 0.3710 | 50 | 0.2 | 1.944 | 10 or more | Present example |
| | Steel sheet after final annealing | 0.050 | 0.040 | 0.0004 | Ni: 0.45 | 0.2404 | | | | | |
| 6 | Slab | 0.060 | 0.070 | 0.0010 | Cu: 0.10 | 0.3410 | 80 | 0.0 | 1.936 | 10 or more | Present example |
| | Steel sheet after final annealing | 0.050 | 0.060 | 0.0003 | Cu: 0.08 | 0.2703 | | | | | |
| 7 | Slab | 0.070 | 0.030 | 0.0010 | Nb: 0.003 | 0.3210 | 120 | 0.0 | 1.940 | 10 or more | Present example |
| | Steel sheet after final annealing | 0.060 | 0.020 | 0.0003 | Nb: 0.002 | 0.2503 | | | | | |
| 8 | Slab | 0.070 | 0.050 | 0.0010 | Ti: 0.003 | 0.3310 | 180 | 0.1 | 1.935 | 10 or more | Present example |
| | Steel sheet after final annealing | 0.060 | 0.040 | 0.0004 | Ti: 0.003 | 0.2704 | | | | | |
| 9 | Slab | 0.100 | 0.020 | 0.0010 | Bi: 0.004 | 0.4210 | 180 | 0.2 | 1.949 | 10 or more | Present example |
| | Steel sheet after final annealing | 0.080 | 0.020 | 0.0003 | Bi: 0.002 | 0.3403 | | | | | |
| 10 | Slab | 0.010 | 0.020 | 0.0002 | — | 0.1802 | 150 | 1.3 | 1.905 | 0 | Comparative example |
| | Steel sheet after final annealing | 0.010 | 0.020 | 0.0001 | — | 0.1401 | | | | | |

According Table 4, it is understood that the bend property is significantly improved in the present examples as compared with the comparative examples.

The invention claimed is:

1. A grain-oriented electrical steel sheet comprising a steel composition consisting of, in mass % or mass ppm: C: 0.005% or less, Si: 2.0% to 5.0%, Mn: 0.01% to 0.5%, sol.Al: 10 ppm or less, N: 15 ppm or less, S and Se: each 10 ppm or less, and at least three selected from Sn, Sb, Cr, P, Mo and B, and optionally Ni: 0.005% to 1.50%, Cu: 0.01% to 0.50%, Ti: 0.0005% to 0.0100%, and Bi: 0.0005% to 0.0100%, with the balance being Fe and inevitable impurities, wherein the steel composition satisfies a following relational expression (1):

$$0.16 \leq [\% Sn] + [\% Sb] + [\% Cr] + 2 \times [\% P] + [\% Mo] + [\% B] \leq 0.50 \quad (1)$$

where [% Sn], [% Sb], [% Cr], [% P], [% Mo] and [% B] each indicate contents in mass % of Sn, Sb, Cr, P, Mo and B in the steel, and 10 or more repeated bends occur before a crack occurs in the grain-oriented electrical steel sheet when a bend test is performed according to JIS C 2553.

2. The grain-oriented electrical steel sheet according to claim 1, wherein a ratio of total grain boundary length of crystal grain boundaries at which silicon nitrides precipitate to total grain boundary length of crystal grain boundaries is 1.0% or less.

* * * * *